(12) United States Patent
Musolesi et al.

(10) Patent No.: US 9,938,893 B2
(45) Date of Patent: Apr. 10, 2018

(54) ELECTROMECHANICAL ACTUATOR FOR AN INTERNAL COMBUSTION ENGINE PROVIDED WITH A CONDITIONING CIRCUIT

(71) Applicant: MAGNETI MARELLI S.p.A., Corbetta (IT)

(72) Inventors: Stefano Musolesi, Bologna (IT); Marcello Colli, Reggio Emilia (IT); Gabriele Giuliani, Budrio (IT); Matteo Avanzi, Crevalcore (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 43 days.

(21) Appl. No.: 14/978,857

(22) Filed: Dec. 22, 2015

(65) Prior Publication Data
US 2016/0186652 A1 Jun. 30, 2016

(30) Foreign Application Priority Data

Dec. 22, 2014 (IT) .............................. BO2014A0720

(51) Int. Cl.
*F02B 37/22* (2006.01)
*F02M 15/02* (2006.01)
(Continued)

(52) U.S. Cl.
CPC ............ *F02B 37/22* (2013.01); *F02M 15/02* (2013.01); *F02M 26/11* (2016.02); *F02M 26/53* (2016.02);
(Continued)

(58) Field of Classification Search
CPC ........ F16K 31/40; F16K 31/041; F16K 31/53; F16K 47/00; F02D 9/10; F02D 9/107; F02D 9/1035; F02D 9/1055; F02M 31/102
(Continued)

(56) References Cited

U.S. PATENT DOCUMENTS 3,780,714 A * 12/1973 Dillow ................... F02M 31/10
123/546
4,561,670 A * 12/1985 Takada ................ B29C 66/1122
280/281.1
(Continued)

FOREIGN PATENT DOCUMENTS

DE 19625154 C1 11/1997
EP 1348850 A1 10/2003
(Continued)

OTHER PUBLICATIONS

Italian Search Report dated Sep. 23, 2015 for Italian Patent Application No. BO2014A000720.

*Primary Examiner* — Matthew W Jellett
(74) *Attorney, Agent, or Firm* — Howard & Howard Attorneys PLLC

(57) ABSTRACT

An electromechanical actuator to operate a component in an internal combustion engine comprising an actuator body housing, on the inside, an actuator device, which controls the movement of the component so as to move it between a maximum opening position and a maximum closing position, and vice versa. The actuator device includes an electric motor and a gear drive that transmits the motion from the electric motor to the component. The electromechanical actuator is made of a first metal material and comprises a conditioning circuit comprising a pipe for the passage of a conditioning fluid, which is made of a second thermally
(Continued)

conductive material. A method of manufacturing the electromagnetic actuator is also disclosed.

3 Claims, 4 Drawing Sheets

(51) Int. Cl.
  *F02M 31/10* (2006.01)
  *F02M 26/11* (2016.01)
  *F02M 26/53* (2016.01)
  *F02M 26/73* (2016.01)
  *F02M 26/05* (2016.01)
  *F02M 26/06* (2016.01)

(52) U.S. Cl.
  CPC ........... *F02M 31/102* (2013.01); *F02M 26/05* (2016.02); *F02M 26/06* (2016.02); *F02M 26/73* (2016.02); *Y02T 10/126* (2013.01)

(58) Field of Classification Search
  USPC ..... 251/129.11–129.13; 285/179.1; 123/337, 123/403
  See application file for complete search history.

(56) References Cited

U.S. PATENT DOCUMENTS

| | | | | |
|---|---|---|---|---|
| 6,408,817 B2* | 6/2002 | Torii | ...................... | F02M 15/02 |
| | | | | 123/142.5 R |
| 6,986,502 B2* | 1/2006 | Hatada | ................... | F02D 9/101 |
| | | | | 123/337 |
| 7,210,451 B2* | 5/2007 | Ikeda | ................... | F02D 11/106 |
| | | | | 123/337 |
| 7,721,706 B2* | 5/2010 | Kim | ...................... | F02D 9/1035 |
| | | | | 123/337 |
| 7,815,167 B2* | 10/2010 | Colli | ...................... | F02D 9/1035 |
| | | | | 123/337 |
| 2005/0155780 A1* | 7/2005 | Hannewald | ............ | F02D 11/10 |
| | | | | 174/480 |
| 2009/0205611 A1* | 8/2009 | Tsugami | ................. | F02D 9/105 |
| | | | | 123/399 |
| 2015/0267622 A1* | 9/2015 | Musolesi | ................ | F02D 9/1005 |
| | | | | 251/304 |
| 2015/0308324 A1* | 10/2015 | Hannewald | ............ | F02M 26/73 |
| | | | | 165/48.1 |
| 2016/0003167 A1* | 1/2016 | Musolesi | ................ | F02D 9/107 |
| | | | | 123/403 |

FOREIGN PATENT DOCUMENTS

| | | |
|---|---|---|
| GB | 1167659 A | 10/1969 |
| JP | 11179817 A | 7/1999 |
| JP | 11193727 A | 7/1999 |

* cited by examiner

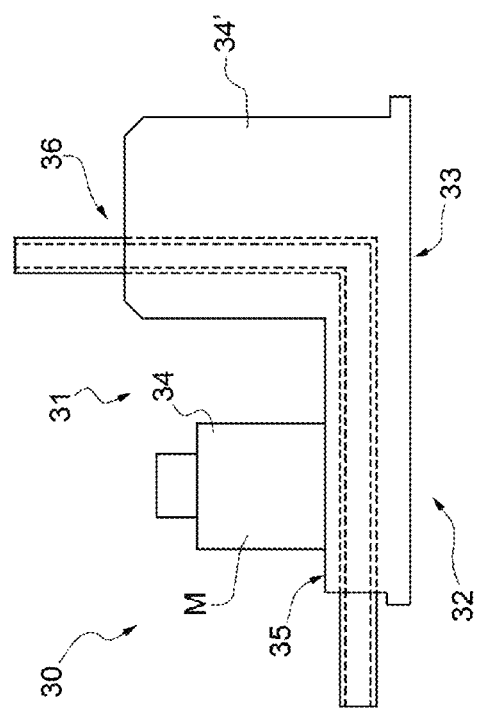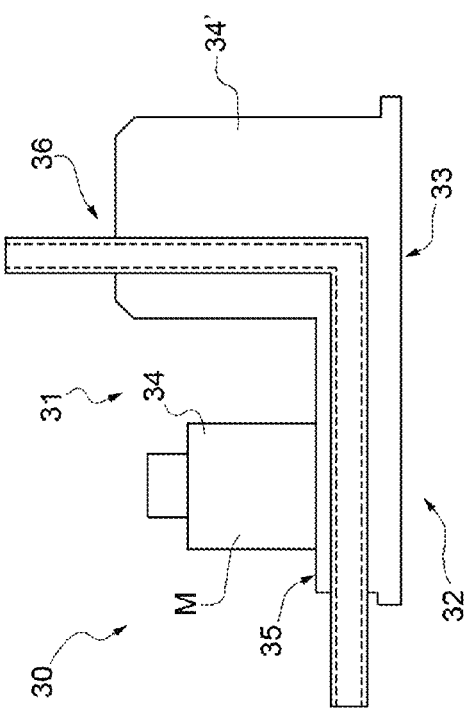

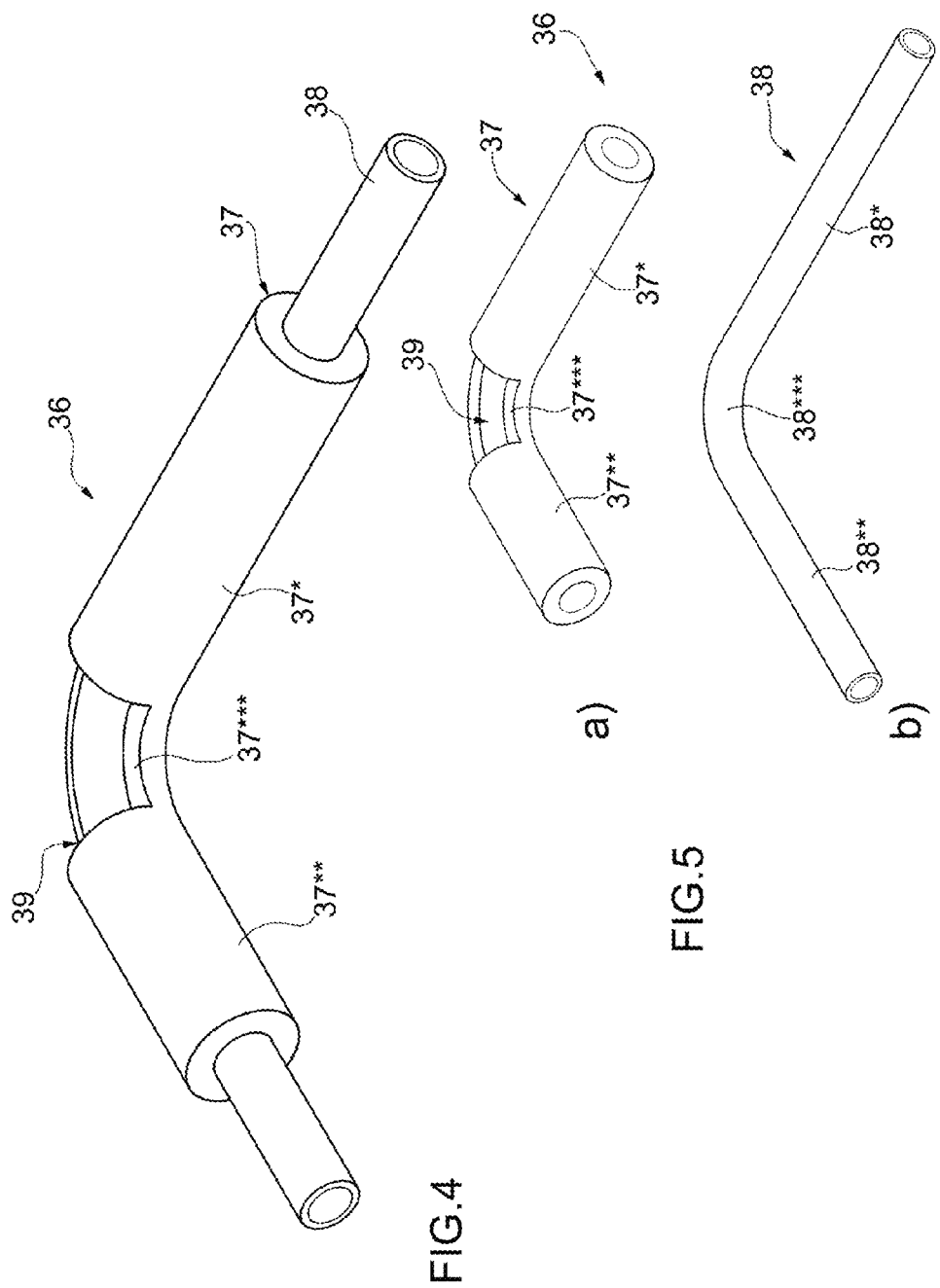

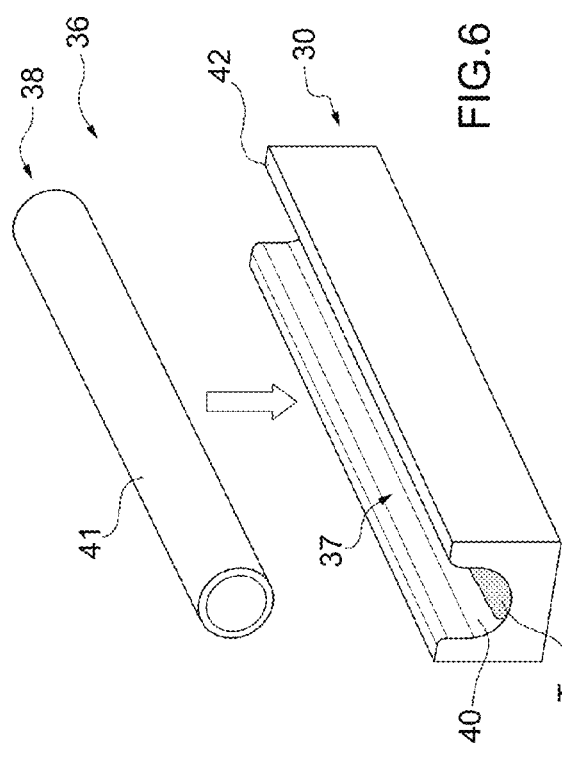
FIG.6
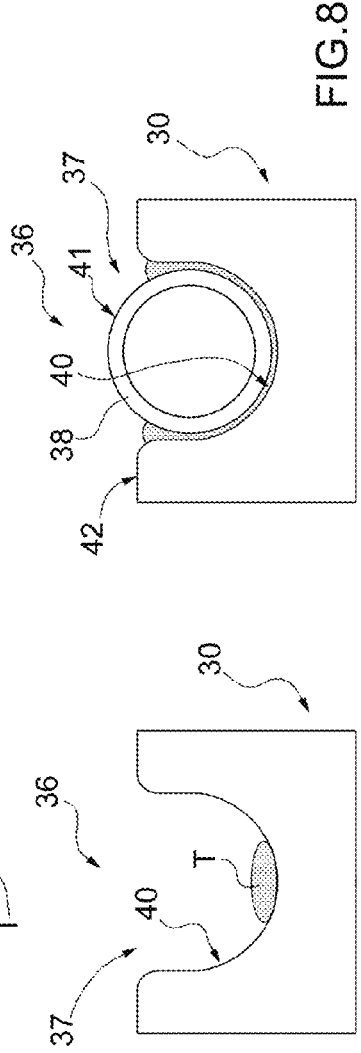
FIG.8
FIG.7

ELECTROMECHANICAL ACTUATOR FOR AN INTERNAL COMBUSTION ENGINE PROVIDED WITH A CONDITIONING CIRCUIT

CROSS-REFERENCE TO RELATED APPLICATIONS

The present application claims priority to and all the benefits of Italian Patent Application No. BO2014A000720, filed on Dec. 22, 2014, which is hereby expressly incorporated herein by reference in its entirety.

BACKGROUND OF THE INVENTION

1. Field of the Invention

The present invention relates to an electromechanical actuator for an internal combustion engine provided with a conditioning circuit.

2. Description of the Related Art

An internal combustion engine supercharged by a turbocharger supercharging system typically includes a number of cylinders, each connected to an intake manifold and to an exhaust manifold. The intake manifold receives a gas mixture comprising both exhaust gases and fresh air, i.e. air coming from the outside through an intake pipe, which is regulated by a throttle valve. The exhaust manifold is connected to an exhaust pipe, which feeds the exhaust gases produced by the combustion to an exhaust system, which releases the gases produced by the combustion into the atmosphere and normally comprises at least one catalytic converter (if necessary, provided with a diesel particulate filter) and at least one silencer arranged downstream of the catalytic converter.

The internal combustion engine supercharging system comprises a turbocharger provided with a turbine, which is arranged along the exhaust pipe so as to rotate at a high speed due to the action of the exhaust gases expelled from the cylinders, and a supercharger, which is arranged along the intake pipe and is mechanically connected to the turbine so as to be caused to rotate by the turbine itself in order to increase the pressure of the air present in the feeding pipe.

The internal combustion engine comprises, furthermore, a high-pressure exhaust gas recirculation circuit and a low-pressure exhaust gas recirculation EGR circuit, along which EGR valves are arranged, which are designed to adjust the flow rate of the exhaust gases. Furthermore, there are provided a plurality of kinematic mechanisms, which are used to move devices such as the EGR valves, which are designed to adjust the flow rate of the exhaust gases, and/or the blades of the turbocharger, in case of a variable-geometry turbocharger.

Both the throttle valve and the aforementioned devices comprise electromechanical controlling actuators to adjust the position between an opening position and a closing position, and vice versa. Electromechanical actuators typically comprise an electric motor and a gear drive, which transmits the motion from the electric motor to a user interface.

In the greatest part of the electromechanical actuators available on the market, the entire holding body is made of a metal material, preferably aluminium, and is a one-piece body (i.e. it is made of one single piece without gaps).

As these electromechanical actuators are requested to operate in environments that get hotter and hotter, the need is felt to be able to condition them, so as to allow them to remain efficient in case of ageing and in case of great electromechanical stresses.

SUMMARY OF THE INVENTION

The object of the present invention is to provide an electromechanical actuator for an internal combustion engine provided with a conditioning circuit. The electromechanical actuator of the present invention is not affected by the drawbacks of the prior art and, at the same time, being easy and cheap to be manufactured. To this end, the electromechanical actuator operates a component in an internal combustion engine. The electromechanical actuator includes an actuator body housing, on the inside, an actuator device, which is entirely made of a first metal material and controls the movement of the component so as to move it between a maximum opening position and a maximum closing position, and vice versa. The actuator device includes an electric motor (M) and a gear drive that transmits the motion from the electric motor (M) to the component. The electromechanical actuator includes a conditioning circuit defined in the actuator body and comprising a pipe for the passage of a conditioning fluid, which is made of a second thermally conductive material. The actuator body comprises a seat that receives the pipe. A layer (S) of a structural and thermally conductive resin with a substantially uniform thickness is interposed between the seat and the pipe and is applied on the entire available surface of the seat, so as to allow the pipe to be fixed in the seat. Both the first material and the second material are chosen from a group including: steel, stainless steel, or aluminium or copper.

A further object of the present invention is to provide a method to manufacture an electromechanical actuator for an internal combustion engine, said method being free from the drawbacks of the prior art and, at the same time, easy and cheap to be implemented.

According to the present invention, there are provided an electromechanical actuator for an internal combustion engine provided with a conditioning circuit and a method to manufacture an electromechanical actuator for an internal combustion engine according to the appended claims.

BRIEF DESCRIPTION OF THE DRAWINGS

Other advantages of the invention will be readily appreciated as the same becomes better understood by reference to the following detailed description when considered in connection with the accompanying drawings, wherein:

FIG. 2 is a plan view, with parts removed for greater clarity, of a first embodiment of the electromechanical actuator of FIG. 1;

FIG. 3 is a plan view, with parts removed for greater clarity, of a second embodiment of the electromechanical actuator of FIG. 1;

FIG. 4 frontally shows a first embodiment of a conditioning circuit of the electromechanical actuator of FIG. 1 in a different and subsequent step of the manufacturing process;

FIG. 5 frontally shows a first embodiment of a conditioning circuit of the electromechanical actuator of FIG. 1 in a different and subsequent step of the manufacturing process;

FIG. 6 is a perspective view of a second embodiment of a conditioning circuit of the electromechanical actuator of FIG. 1; and FIG. 7 frontally shows the detail of the conditioning circuit of FIG. 6 in a different and subsequent step of the manufacturing process implemented to produce the electromechanical actuator of FIG. 1.

FIG. 8 frontally shows the detail of the conditioning circuit of FIG. 6 in a different and subsequent step of the manufacturing process implemented to produce the electromechanical actuator of FIG. 1.

DETAILED DESCRIPTION OF THE INVENTION

Figure 1:
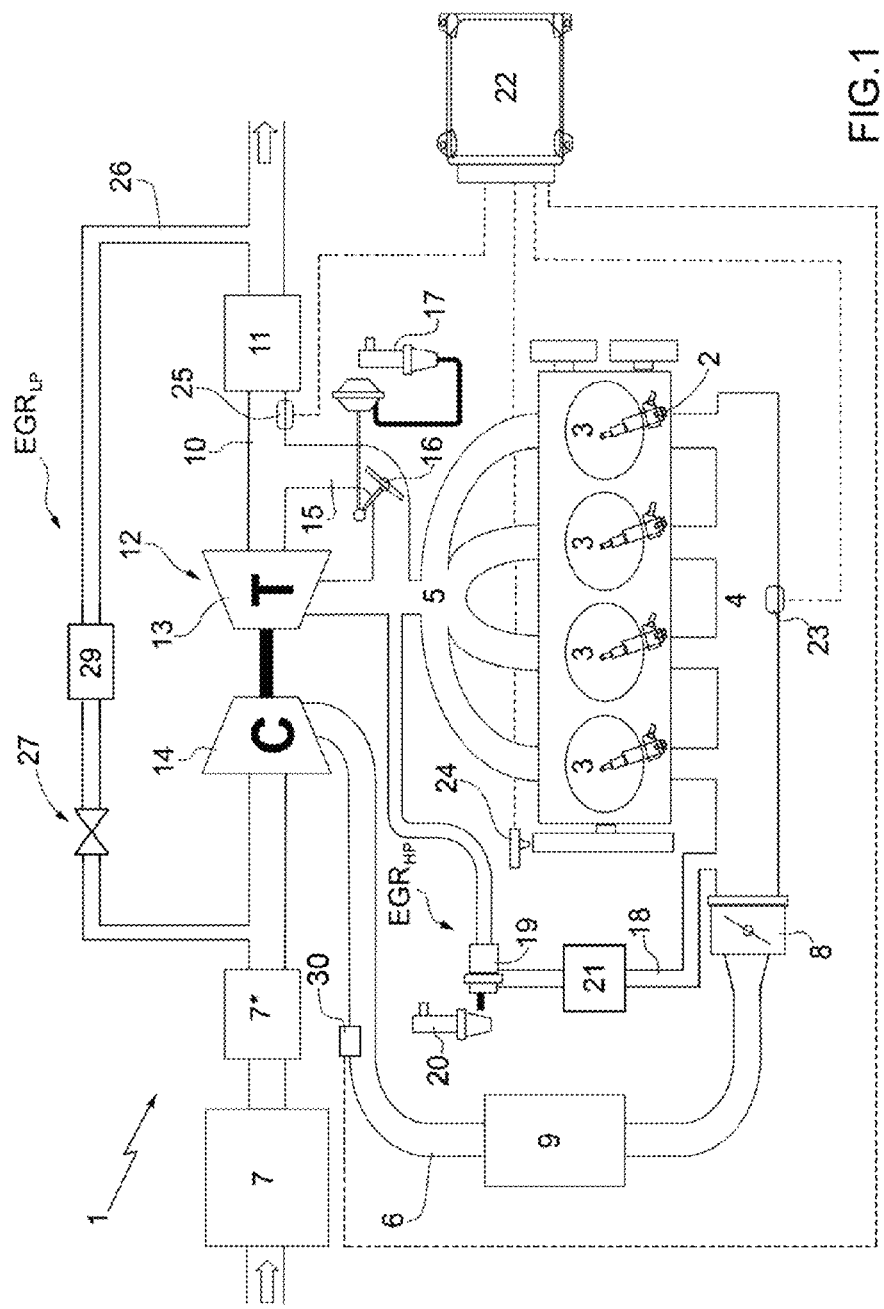
FIG. 1 is a schematic view of a supercharged internal combustion engine provided with an electromechanical actuator according to the present invention.

In FIG. 1, number 1 indicates, as a whole, an internal combustion engine supercharged by a turbocharger supercharging system 2.

The internal combustion engine 1 comprises a number of cylinders 3 (in particular, FIG. 1 shows four cylinders 3), each connected to an intake manifold 4 by at least one respective intake valve (not shown) and to an exhaust manifold 5 by at least one respective exhaust valve (not shown). The intake manifold 4 receives fresh air (i.e. air coming from the outside) through an intake pipe 6, which is provided with an air filter 7 and is regulated by a throttle valve 8. Along the intake pipe 6 there is provided an intercooler 9, which fulfils the function of cooling the air taken. The exhaust manifold 5 is connected to an exhaust pipe 10, which feeds the exhaust gases produced by the combustion to an exhaust system, which releases the gases produced by the combustion into the atmosphere and normally comprises at least one catalytic converter 11 and at least one silencer (not shown) arranged downstream of the catalytic converter 11.

The supercharging system of the internal combustion engine 1 comprises a turbocharger 12 provided with a turbine 13, which is arranged along the exhaust pipe 10 so as to rotate at a high speed due to the action of the exhaust gases expelled from the cylinders 3, and a supercharger 14, which is arranged along the intake pipe 6 and is mechanically connected to the turbine 13 so as to be caused to rotate by the turbine 13 itself in order to increase the pressure of the air fed into the feeding pipe 6.

Along the exhaust pipe 10 there is provided a bypass pipe 15, which is connected in parallel to the turbine 13 so as to have its ends connected upstream and downstream of the turbine 13 itself. Along the bypass pipe 15 there is provided a wastegate valve 16, which is designed to adjust the flow rate of the exhaust gases flowing through the bypass pipe 15 and is controlled by an actuator 17.

The internal combustion engine 1 comprises, furthermore, a high pressure EGR circuit EGRHP, which comprises, in turn, a bypass pipe 18 connected in parallel to the assembly consisting of the cylinders 3, the intake manifold 4 and the exhaust manifold 5. Along the bypass pipe 18 there is provided a blowoff valve 19, which is designed to adjust the flow rate of the exhaust gases flowing through the bypass pipe 18 and is controlled by an EGR solenoid valve 20. Along the bypass pipe 18, downstream of the blowoff valve 19, there is provided a heat exchanger 21, which fulfils the function of cooling the gases flowing out of the exhaust manifold 5.

The internal combustion engine 1 is controlled by an electronic control unit 22, which controls the operation of all the components of the internal combustion engine 1. The electronic control unit 22 is connected to a sensor 23 measuring the temperature and the pressure of the gas mixture present in the intake manifold 4, to a sensor 24 measuring the number of revolutions per minute of the internal combustion engine 1, and to a sensor 25 (typically a UHEGO or UEGO linear oxygen sensor—which is known and not described below) measuring the air/fuel ratio of the exhaust gases upstream of the catalytic converter 11.

Finally, the internal combustion engine 1 comprises a low pressure EGR circuit EGRLP, which comprises, in turn, a bypass pipe 26 arranged along the exhaust pipe 10; the bypass pipe 26 is connected in parallel to the turbocharger 12. Along the bypass pipe 26 there is provided an EGR valve 27, which is designed to adjust the flow rate of the exhaust gases flowing through the bypass pipe 26. Along the bypass pipe 26, upstream of the valve 27, there is also provided a heat exchanger 29, which fulfils the function of cooling the gases flowing out of the exhaust manifold 5 and into the supercharger 14. According to an alternative embodiment, the low-pressure EGR circuit EGRLP comprises a three-way mixing device, which is arranged in the area of the intersection between the exhaust pipe 10 and the intake pipe 6 and fulfils the function of regulating the mixing of the exhaust gases coming from the exhaust pipe 10 with the fresh air present in the intake pipe 6.

The low-pressure EGR circuit EGRLP originates from the exhaust pipe 10 downstream of the catalytic converter 11, so as to collect the exhaust gases that have already been treated by the catalytic converter 11 itself and have a pressure that is only slightly greater than the atmospheric pressure. In this way, the exhaust gases recirculated by the bypass pipe 26 are "cleaner", i.e. they have a smaller quantity of pollutant substances. This configuration is also called "Long-Route" EGR, as the bypass pipe 26 must be longer than normal to get downstream of the catalytic converter 11.

In FIGS. 2 and 3, number 30 generically indicates an electromechanical actuator 30. The electromechanical actuator 30 shown in FIGS. 2 and 3 is designed to control the EGR solenoid valve 20 controlling the blowoff valve 19 used to adjust the flow rate of the exhaust gases flowing through the bypass pipe 18, or alternatively a solenoid valve controlling the EGR valve 27 used to adjust the flow rate of the exhaust gases flowing through the bypass pipe 26, or alternatively a solenoid valve controlling the three-way mixing device arranged in the area of the intersection between the exhaust pipe 10 and the intake pipe 6, or even for the activation of the devices making part of the equipment of the turbocharger 12 (such as blades and/or valves).

The electromechanical actuator 30 comprises an actuator device 31, which controls the EGR solenoid valve 20. In particular, the actuator device 31 comprises an electric motor M, which causes the movement of the EGR solenoid valve 20, and a connection element (not shown), which establishes a mechanical connection between the EGR solenoid valve 20 and the electric motor M. In particular, the actuator device 31 comprises a gear drive (not shown in detail), which transmits the motion from a shaft of the electric motor M to a shaft of the EGR solenoid valve 20. The shaft of the EGR solenoid valve 20 has an outer portion, which projects in order to be coupled to the actuator device 31.

The electromechanical actuator 30 comprises a box 32, into which the outer portion of the EGR solenoid valve 20 projects. Furthermore, the box 32 houses, on the inside, the connection element, the electric motor M and the gear drive.

The box 32 is supported by the intake pipe 6, to which it is fixed by screws, and is provided with a removable lid 33, which is provided with an annular gasket to ensure an adequate seal. Furthermore, the box 32 has a substantially cylindrical housing 34, which extends perpendicularly to a wall 35 of the box 32 and houses, on the inside, the electric motor M.

According to a first variant, the electromechanical actuator 30 is entirely made of a first material and comprises the housing 34 and an L-shaped chamber 34', which houses the gear drive and is closed by the removable lid 33. According to a preferred embodiment, the material making up the electromechanical actuator 30 is a metal material, in particular aluminium or steel, preferably stainless steel, or copper.

According to a further variant, the removable lid 33 is made of a plastic material.

The electromechanical actuator 30 comprises, furthermore, a conditioning circuit 36, which comprises, in turn, a seat 37 and a pipe 38.

FIGS. 2, 4 and 5 relate to a first embodiment of the conditioning circuit 36. In its plan view, the seat 37 is substantially L-shaped and has greater branch 37* and a smaller branch 37, which are both obtained in the box 32 (in particular, in the two branches of the chamber 34'), and a curved joining segment 37* between the greater branch 37* and the smaller branch 37**. The seat 37 receives, on the inside, the pipe 38, which is made of a second material and is also substantially L-shaped with a greater branch 38*, a smaller branch 38 and a curved joining segment 38* between the greater branch and the smaller branch. According to one variant, the second material making up the pipe 38 is a material selected from a group including, but not limited to: steel, stainless steel, copper, aluminium or any other material with a good heat exchange capacity. The pipe 38 hydraulically communicates with a pump (not shown), which causes the fluid to circulate and feeds it to the pipe 38 for the conditioning of the different parts of the electromechanical actuator 30.

The electromechanical actuator 30 is manufactured by casting (usually die casting) with the pipe 38 inserted into the die and, if necessary, it subsequently undergoes a mechanical machining. In other words, the first material making up the electromechanical actuator 30 is injection-overmoulded around the pipe 38, so that the outer surface of the pipe 38 is arranged in contact with the inner surface of the seat 37.

According to one embodiment, on the inside of the die used for the production of the electromechanical actuator 30 by a casting (usually die casting) there is housed a striker-support element, which, during the injection, acts as a striker and as a support for the pipe 38, so as to avoid movements of the pipe 38 itself. According to FIGS. 5 and 6, in detail, the support element is preferably arranged on the inside of the die, in the area of the curved joining segment 38* of the pipe 38. The curved joining segment 37* between the greater branch 37* and the smaller branch 37 is open on the upper side. In particular, the curved joining segment 37* has an upper window 39, whose shape is complementary to the shape of the support element arranged on the inside of the die. Therefore, the seat 37 made to receive the pipe 38 is at least partially open.

It is evident that the conditioning circuit 36 can alternatively have shapes that are different from the substantial L-shape described above. In particular, according to alternative embodiments, the conditioning circuit 36 (i.e. the seat 37 and the pipe 38) has a straight shape and is alternatively obtained in one of the two portions of the box 32.

FIGS. 3, 6, 7 and 8 relate to a second embodiment of the conditioning circuit 36 and the same parts are indicated, where possible, with the same reference numbers.

According to FIGS. 6 to 8, the seat 37 has, in its cross section, the shape of a circular segment, is open on the upper side and the surface 40 that defines the seat 37 itself has a shape that is substantially complementary to the outer surface 41 of the pipe 38. The pipe 38 hydraulically communicates with a pump (not shown), which causes the fluid to circulate and feeds it to the pipe 38 for the conditioning of the different parts of the electromechanical actuator 30.

The electromechanical actuator 30 is manufactured by a casting (usually die casting) and, if necessary, it subsequently undergoes a mechanical machining. In other words, the first material making up the electromechanical actuator 30 is moulded or injection moulded so as define the seat 37 made to house the pipe 38.

According to FIGS. 6 to 8, in detail, the pipe 38 is inserted into the U-shaped seat 37 obtained in the box 32 after having completed the casting process of the electromechanical actuator 30 itself.

Once the manufacturing process of the electromechanical actuator 30 is completed, you can move on and apply a trace T of a structural and thermosetting resin. The trace T of the structural and thermosetting resin is deposited by a suitable application tool, preferably on the bottom of the seat 37 itself (as you can see in FIGS. 4 and 5).

After having deposited the trace T of the structural and thermosetting resin, the pipe 38 is inserted into the seat 37. The resin present on the bottom of the seat 37 moves upwards, so as to completely cover the inner surface 40 of the seat and so as to partially cover the outer surface 41 of the pipe 38, so that it does not get out of the seat 37 towards of an upper surface 42 of the electromechanical actuator 30. By so doing, a substantially uniform layer of structural and thermosetting resin is created in a position interposed between the seat 37 and the pipe 38 (as you can see in FIG. 8).

According to one variant, the electromechanical actuator 30 can subsequently be subject to a thermal treatment (e.g. by means of infrared, induction or through the passage in polymerization oven), so as to complete the polymerization of the structural and thermosetting resin. Both a single-component structural and thermosetting resin and a double-component structural and thermosetting resin can find advantageous application. The polymerization parameters of the structural and thermosetting resin are variable based on the components of the structural and thermosetting resin.

Once polymerized, the resin can constrain the pipe 38 to the seat 17 and, furthermore, it allows an exchange of heat between the conditioning fluid and the electromechanical actuator 30. Furthermore, the structural and thermosetting resin has a high resistance to possible thermal shocks and has maximum operating temperatures that are relatively high (around 380° C.).

According to one variant, the seat 37 is open on the upper side and the pipe 38 is rigidly constrained to the seat 37 exclusively by the structural and thermosetting resin.

According to another variant, there are provided mechanical locking mechanisms (not shown) to lock the pipe 38 in the relative seat 37, such as for example a number of brackets or fixing plates distributed along the entire length of the pipe 38. It is evident that the conditioning circuit 36 can alternatively have shapes that are different from the substantial L-shape described above.

In particular, according to alternative embodiments, the conditioning circuit 36 (i.e. the seat 37 and the pipe 38) has a straight shape and is alternatively obtained in one of the two portions of the box 32.

The electromechanical actuator 30 can be designed to control any device present in the engine compartment and, in particular, the electromechanical actuator 30 can be used to control any component selected from a group including, but not limited to, devices that are part of the equipment of the variable-geometry turbocharger 12 (such as, for example, blades and/or valves), the blowoff valve 19, which is designed to adjust the flow rate of the exhaust gases flowing through the bypass pipe 18, the wastegate valve 16, the low-pressure EGR valve 27, which is designed to adjust the flow rate of the exhaust gases flowing through the bypass pipe 26, the high-pressure EGR valve, the valve for the regulation of the cooling/oil circuit, the exhaust gas partitioning valve or the valve for adjusting of flaps/aerodynamic appendages.

In these cases, the box 32 can have shapes that are different from the ones described so far. For example, the box 32 can include a cup-shaped body provided with a substantially cylindrical side wall. Basically, the common trait shared by the different embodiments of the electromechanical actuator 30 lies in controlling a component of the internal combustion engine 1, so as to move it between a maximum opening position and a maximum closing position, and vice versa.

In view of the above, the use of the electromechanical actuator 30 described so far for the operation of the throttle valve 8 is excluded.

Furthermore, it should be pointed out that the electromechanical actuator 30 can alternatively be both a rotary actuator and a linear actuator.

The electromechanical actuator 30 described above has numerous advantages.

First of all, the electromechanical actuator 30 described above is easy and cheap to be manufactured, as it can easily be produced by injection moulding and of the subsequent application of the resin to lock the pipe 38 in the seat 38, or by an injection moulding of the box 32 around the pipe 38.

Furthermore, the electromechanical actuator 30 described above has a weight and manufacturing costs that are extremely small. Finally, the electromechanical actuator 30 prevents the conditioning fluid used in the conditioning circuit and contained in the pipe 38 from flowing, for example, towards the electric motor M or towards the outside during its use and regardless of ageing phenomena.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. An electromechanical actuator to operate a component in an internal combustion engine, said electromechanical actuator comprising an actuator body housing, an actuator device supported in said housing, said actuator device being made of a first metal material and controls the movement of the component so as to move it between a maximum opening position and a maximum closing position; the actuator device comprises an electric motor (M) and a gear drive that transmits the motion from the electric motor (M) to the component; the electromechanical actuator including a conditioning circuit supported in said actuator body housing and comprising a pipe for the passage of a conditioning fluid, said pipe being made of a second thermally conductive material; wherein the actuator body housing includes a seat that receives the pipe and wherein a layer (S) of a structural and thermally conductive resin with a substantially uniform thickness is interposed between the seat and the pipe and is applied on the entire available surface of the seat between the pipe and the seat; the layer (S) of the structural and thermally conductive resin completely covers an inner surface of the seat and partially covers an outer surface of the pipe, so that the structural and thermally conductive resin does not extend out of the seat towards an upper surface of the electromechanical actuator and so as to allow the pipe to be fixed in the seat; and wherein both the first metal material and the second thermally conductive material are chosen from a group including: steel, stainless steel, aluminum or copper; wherein the seat has an upper side facing an upper side of the electromechanical actuator with an opening along an entire length of the seat to receive a longitudinal length of the pipe; and a surface that defines the seat itself, said surface having a shape that is complementary to an outer surface of the pipe.

2. The actuator as set forth in claim 1, that is operable to control components chosen from a group including: devices that are part of a variable-geometry turbocharger, a blowoff valve, which is designed to adjust the flow rate of the exhaust gases, a wastegate valve, a low-pressure EGR valve, a high-pressure EGR valve, a valve for the regulation of a cooling/oil circuit, or an exhaust gas partitioning valve.

3. The actuator as set forth in claim 1 and comprising a mechanical locking mechanism to lock the pipe in the seat.

\* \* \* \* \*